US011151616B2

(12) United States Patent
Weldemariam et al.

(10) Patent No.: US 11,151,616 B2
(45) Date of Patent: Oct. 19, 2021

(54) CONTEXTUAL INFORMATION INSERTION IN CONTEXT WITH CONTENT

(71) Applicant: International Business Machines Corporation, Armonk, NY (US)

(72) Inventors: Komminist Weldemariam, Ottawa (CA); James R. Kozloski, New Fairfield, CT (US); Michael S. Gordon, Yorktown Heights, NY (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 107 days.

(21) Appl. No.: 16/510,171

(22) Filed: Jul. 12, 2019

(65) Prior Publication Data

US 2021/0012390 A1  Jan. 14, 2021

(51) Int. Cl.
*G06Q 30/00* (2012.01)
*G06Q 30/02* (2012.01)
*G10L 15/08* (2006.01)
*G06K 9/00* (2006.01)

(52) U.S. Cl.
CPC ..... *G06Q 30/0277* (2013.01); *G06K 9/00463* (2013.01); *G06Q 30/0242* (2013.01); *G10L 15/083* (2013.01); *G10L 2015/088* (2013.01)

(58) Field of Classification Search
None
See application file for complete search history.

(56) References Cited

U.S. PATENT DOCUMENTS

| 7,478,089 B2 | 1/2009 | Henkin et al. | |
| 8,832,728 B2 | 9/2014 | Schiller et al. | |
| 9,870,345 B2 | 1/2018 | Sharifi et al. | |
| 2009/0144156 A1* | 6/2009 | Girgis | G06Q 30/0273 705/14.69 |
| 2013/0179246 A1* | 7/2013 | Ross | G06Q 30/0207 705/14.24 |
| 2013/0179257 A1 | 7/2013 | Mei et al. | |
| 2014/0055674 A1* | 2/2014 | Sakata | H04N 5/44591 348/564 |
| 2014/0250219 A1* | 9/2014 | Hwang | G06F 40/45 709/224 |
| 2015/0254732 A1* | 9/2015 | Snyder | G06Q 30/0277 705/14.72 |
| 2015/0363407 A1* | 12/2015 | Huynh | H04L 67/02 707/738 |
| 2015/0370331 A1* | 12/2015 | Gonzales, Jr. | G06F 3/013 345/156 |

(Continued)

OTHER PUBLICATIONS

STIC EIC Search Report dated Feb. 12, 2021 (Year: 2021).*

(Continued)

*Primary Examiner* — Matthew T Sittner
(74) *Attorney, Agent, or Firm* — Scully, Scott, Murphy & Presser, P.C.; Shimon Benjamin

(57) ABSTRACT

Context associated with content may be received. An additional content may be generated for insertion into the content. The additional content can be created to be within the context associated with the content and based on a likely responsiveness of the user to the additional content, the additional content referring to an item. The additional content preserves continuity and/or semantics in the context of the content.

12 Claims, 7 Drawing Sheets

(56) References Cited

U.S. PATENT DOCUMENTS

2016/0110899 A1    4/2016  Kalb et al.
2016/0171552 A1    6/2016  Mason et al.
2016/0359791 A1*  12/2016  Zhang .................. H04L 51/046
2017/0185256 A1    6/2017  Bennett
2018/0336444 A1*  11/2018  Ramasamy ........ G06K 15/1889
2019/0050486 A1*   2/2019  Ramachandra Iyer .....................
                                                H04N 21/44218

OTHER PUBLICATIONS

STIC EIC 3600 Search Report for U.S. Appl. No. 16/510,171 dated Feb. 12, 2020 (Year: 2020).*
IP.com search strategy dated Feb. 4, 2021. (Year: 2021).*
IP.com search strategy dated Jun. 7, 2021. (Year: 2021).*
Chu, E., et al., "AI in storytelling: Machines as cocreators", Dec. 2017, 9 pages, https://www.mckinsey.com/industries/media-and-entertainment/our-insights/ai-in-storytelling.
Greene, T., "This AI storyteller fools humans 3 out of 5 times", Artificial Intelligence, Apr. 26, 2018, 3 pages, https://thenextweb.com/artificial-intelligence/2018/04/26/this-ai-storyteller-fools-humans-3-out-of-5-times/.
Eidnes, L., "Auto-Generating Clickbait With Recurrent Neural Networks", Oct. 13, 2015, 10 pages, https://larseidnes.com/2015/10/13/auto-generating-clickbait-with-recurrent-neural-networks/.
NIST, "NIST Cloud Computing Program", http://csrc.nist.gov/groups/SNS/cloud-computing/index.html, Created Dec. 1, 2016, Updated Oct. 6, 2017, 9 pages.

\* cited by examiner

CONTEXTUAL INFORMATION INSERTION IN CONTEXT WITH CONTENT

BACKGROUND

The present application relates generally to computers and computer applications, and more particularly to user consumption of content via a device and creating additional content for insertion into the content.

Some web site's web page can dynamically insert a video-based advertisement on the page. In some instances, video-based advertisements may automatically appear between two textual contents. In other aspects, artificial intelligence-based voice response systems may deliver storytelling, for example, based on the user's voice command, with advertisements in between the story content. In such examples, however, the inserted advertisement is different from the actual content, which can create interrupts while reading a story or listening to the audio-based story.

BRIEF SUMMARY

In one aspect, a computer-implemented method may include receiving context associated with content for presenting to a user. The method may also include creating an additional content to insert into the content, the additional content created to be inserted within the context associated with the content and based on a likely responsiveness of the user to the additional content, the additional content referring to an item. The additional content can preserve continuity and/or semantics in the context of the content.

A system, in one aspect, may include a hardware processor. A storage device may be operably coupled to the hardware processor, the storage device storing information related to a plurality of items. The hardware processor may be operable to analyze content being consumed to determine context of the content. The hardware processor may be further operable to receive from the storage device information associated with an item, the item related to the context of the content. The hardware processor may be further operable to receive a characteristic of a user consuming the content. The hardware processor may be further operable to, based on the context and the characteristic of the user, create an additional content including at least a reference to the item, for inserting into the content. The additional content can preserve continuity and/or semantics in the context of the content.

In another aspect, a computer-implemented method may include receiving contextual information associated with content being consumed by a user. The method may also include receiving product information from a database storing product information. The method may further include receiving characteristic information associated with the user. The method may further include, based at least on the contextual information, the product information and the characteristic information, creating an additional content to insert into the content, wherein the additional content preserves continuity in the context of the content. The method may also include receiving the user's current focus of attention in consuming the content. The method may further include, at least based on the user's current focus of attention and the characteristic information, modifying the additional content.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
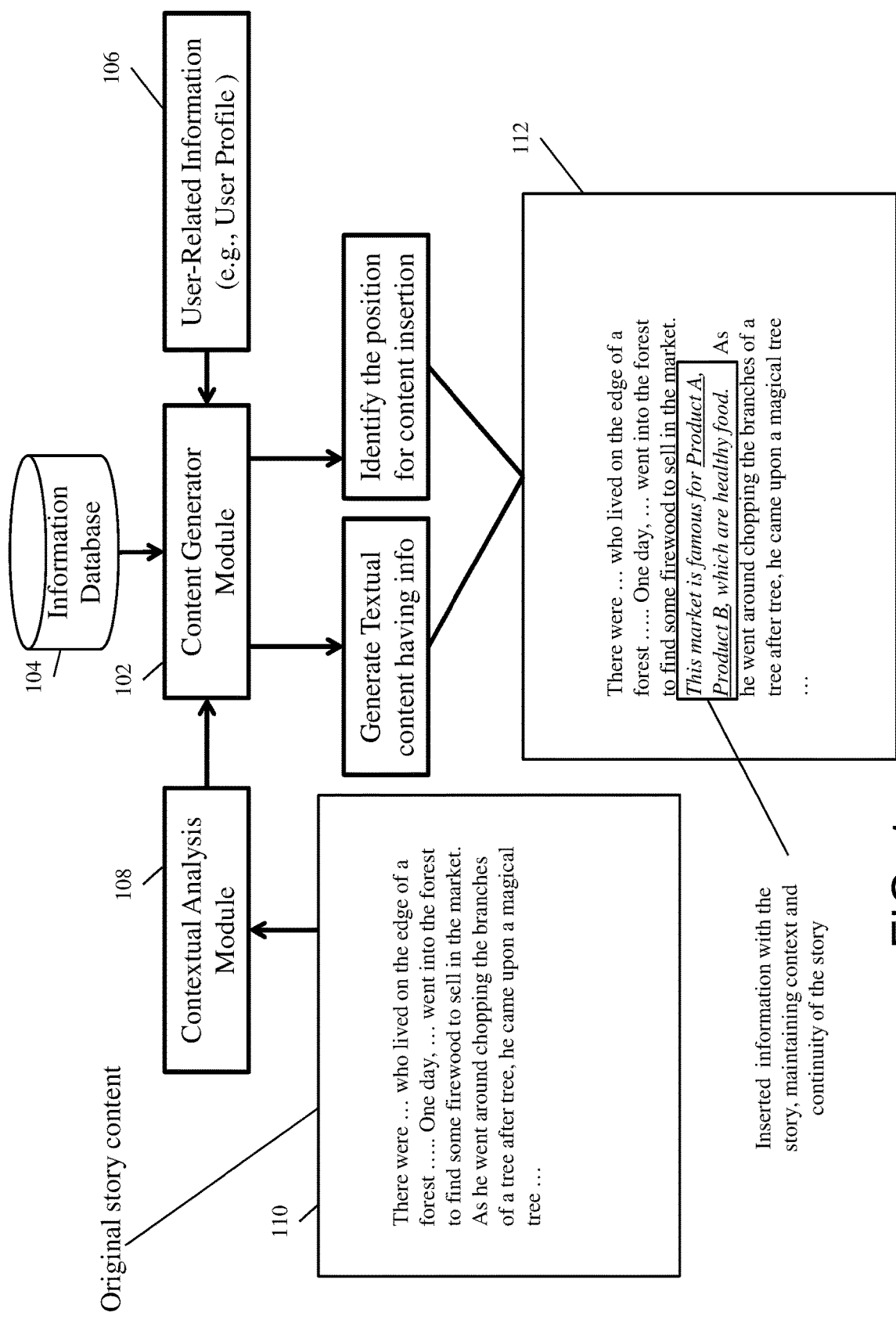
FIG. 1 is a block diagram illustrating components of a computing system for inserting contextual textual information with textual content.

A system, method and technique may be provided, which may perform contextual analysis of any story content and identify a portion of the story where one or more additional information or content (e.g., an advertisement) can be inserted without changing contextual and semantic sense of the story or changing the continuity and/or semantics of the story. Such contextual insertion may allow the added content to flow with the story, for example, make the added content seem like a part of the story. Story can include, but is not limited to news, a blog, an article and/or another content.

In some embodiments, one or more computer modules or functionalities may analyze a story (referred to as an original story for explanation sake), for example, for its context, and based at least on the context, also may dynamically create content such as textual content which may be an advertisement, and which can be added to the original story's content.

In some embodiments, when content such as an advertisement content text is added with the original story content, the system may provide a visual indication for the added content (e.g., inserted advertisement), so that a user reading or consuming the story can recognize the inserted content (e.g., an advertisement). In the case in which the story is being presented in audio form or sound (e.g., a user is listening to the story content), then voice or speech characteristic can be changed while the inserted content (e.g., an advertisement) is being narrated, for example, by a device via which the user is consuming the story content.

In some embodiments, machine learning may be performed on the user's reaction on the inserted content (e.g., an advertisement), user's need, type of story being read or consumed, type of product or service the inserted content pertains to. For example, historical user's reaction on different types of contents, advertisement, likes, dislikes, and/or others can be analyzed to understand user's choice and build a machine learning model. In one embodiment, at least one reaction associated with the user can be detected in relation to the inserted content (e.g., an advertisement) based on instrumented data and plurality of other data sources (e.g., historical user reactions on different types of contents, advertisements, engagements/interactions such as like/unlike, real-time sensor reading such as from front facing camera, etc.). In one implementation example, training a machine learning model can include training one or more of a deep learning model, sentiment analysis model, etc., to extract, detect, characterize and recognize at least one reaction from text, video or audio data by cross-referencing across different emotion categories (e.g., the 6 emotion categories such as anger, disgust, fear, happiness, sadness and surprise) that are used to describe user's basic emotions. In another embodiment, the system may learn the possible actions, by using a trained reinforcement learning algorithm, the user will take or has taken in response to inserted content (e.g., an advertisement) with associated detected reactions (and emotions) and based on the learned possible actions, the system may modify content insertion thereof.

In some embodiments, the system may create and continuously update a knowledge corpus to identify, how product or services information can be added with content to be inserted, how the content to be inserted can be merged with the original story content.

In some embodiments, the system may create the content to be inserted dynamically, for example, and modify the content depending on the reader's (or consumer's) focus of attention (FOA). For example, as the FOA moves from word to word, the system executes the machine learning model (also referred to as a reaction model for explanation sake) identifying likelihood of a user responsiveness level. The method of identifying may be based on user's focus on the content where the user is looking, contextual sense of the content the user is reading, and accordingly identify what type or types of inserted content (e.g., an advertisement) can be inserted with the content. For example, based on content analytics, and a type of content valence in relation to a user profile, content to be inserted can be dynamically created. A user profile may include user's interactions/engagements (e.g., likes, dislikes) with inserted or to be inserted content (e.g., an advertisement) and the content the user is currently reading (e.g., FOA). The user profile can be analyzed and accordingly appropriate content may be inserted, As an example, it may be determined that this particular user likes chocolate, and the current FOA is related to chocolate (e.g., the story content the user is currently reading or consuming is referring to a character in the story consuming chocolate milk. In that example, a dynamically created content can be an advertisement related to a product associated with chocolate, and the insertion location in the story can be in the vicinity of the current reading point about chocolate, for example, before or after a sentence referencing chocolate.

Based on this tracking of FOA and the responsiveness model, the system can provide content such as an advertisement to be inserted into the story dynamically. In some embodiments, the content to be inserted need not be in the FOA, which may create an interruption to the user based on the analysis of the flow of the story. For instance, in some embodiments, the system may ascertain whether or not the content (e.g., advertisement) should be place just ahead of the FOA in the text, such that the reader reaches the inserted content (e.g., advertisement) in a predicted amount of time t. In some embodiments, the content can be placed just behind the FOA in the story (e.g., text), or in a previous line or sentence. In some embodiments, the system may "slip" the content (e.g., advertisement) into the previously read text so that the user is not disrupted or interrupted from their consumption process. Upon rereading (or re-consuming) a sentence, paragraph or section, the user may find the inserted content such as an advertisement.

In some embodiments, the previous text (content such as a sentence) can b or e replaced by the content to be inserted (e.g., advertisement) as the user reads (e.g., rather than inserted in a previous section). By replacing the text, a user is still allowed to read the text that is ahead (e.g., the original story) and also can look back to the replaced text if desired.

In some embodiments, the system may insert the added content in random positions within the story and the insertion position within the story may change, for example, responsive to detecting that a user is rereading the story. In some embodiment, the inserted content may appear in yet another position if the story is read by a different user or reader. The content of the inserted content may change, for example, depending on where the content is inserted so that the insertion of the content does not appreciably change the continuity and/or semantics of the original story. In some embodiments, the number of times the user is reading or has read the original content is detected; and, the type of content to be inserted, the location (e.g., a <position, coordinate> pair) where to insert the content can be modulated accordingly. As an example an inserted content is not inserted when the user reads the story the first time, but is inserted at random or predetermined positions upon the story being reread one or more times.

In some embodiments in which the story is presented by audio (e.g., a device narrates the story vocally for the user to listen), the system may change the cadence (or another characteristic) of the reading during the period of time when the inserted content (e.g., an advertisement) is being read so that the inserted content may be distinguished from the story. The degree of the difference in cadence or another vocal characteristic can be configurable, and can be just enough so that the user can tell the difference. As an example, the reader (e.g., device narrating) can speak more quickly when the inserted content (e.g., an advertisement) is read compared to the rest of the story. The effect of changing the cadence (or another characteristic) of the reading may be subliminal, for example, below the user's threshold of conscious awareness, for example, so that any disruption in the story or continuity or semantics of the story can be avoided.

In some embodiments, the system may change or cause to change, the font, resolution, pixel intensity, color, shade, and/or style (or another distinguishable feature) of the text being inserted with its placement, for example, to garner the user's attention. The change may be subtle, for instance, one or more of, changing the shade of the color of the text, adding italics to the text. In another aspect, the change need not be subtle, for example, such as presenting the inserted text in a completely different color. The system may also change or cause to change the font, resolution, color, and/or style (or another feature) depending on the number of times the story is read by the user. The system may also change or cause to change the font, resolution, color, and/or style (or another feature) depending on which user is reading the story and an individual user's preference, for example, prerecorded preference.

In some embodiments, the system may estimate the current reading progression rate of a user, which may be used in determining whether to promote or de-promote an inserted content such as an advertisement, for example, determine the frequency and/or the number of contextual content to be inserted (e.g., how many advertisements on a page, after a user has read n number of pages (e.g., 5 pages), after a section, etc.). The system may estimate the current progression rate (speed of reading of the content, which, for example, can be identified or determined by tracking user's eye movement). In an embodiment, the current progression rate can be estimated based on performing a similarity analysis from cohort of users, coupled with using at least one content analytics algorithm configured to determine an estimated reading time for a user to complete a sentence, section, a page, or a portion of the content. Such content analytics algorithm may in real-time collect data as a user scrolls down and/or up a page, and perform gaze pattern analysis and/or track eye movements. Other data may be used to determine the current progression rate. The reading progression rate may be related to the reader set goal or goals. For example, the user may have set a goal such as finishing n number of sections (e.g., 4 sections) by a set time (e.g., by 5 PM today).

In some embodiments, the system may determine to insert a contextual content (e.g., advertisement) based on user's or reader's effectiveness. The reader effectiveness can be the degree of the effectiveness of a user in terms of the ability of the user to complete a given amount of reading of the story, e.g., 3 to 4 sections of the story every day. The system may estimate or predict the user ability to complete a specified section of a story in a predefined time based on the estimated progression rate, estimated degree of the user engagement with the story, by analyzing historical data (e.g., of similar story cohort) and/or real-time monitoring data (e.g., sensor data, front facing camera data, etc.). Based on the estimated reading progression rate of the user, the system may determine the degree of user effectiveness in relation to progression towards completion of the story. In an embodiment, the degree of user effectiveness can be calculated based on a historical reading pattern of the texts or the story, e.g., how quickly the user reads. A user's profile can also be considered, which may include indications such as the user's reading pattern or rate associated with a given topic. For instance, user A reads content associated with topic X very quickly; user A takes more time in reading topic Y. As an example, the user may read mathematical equations more slowly than the adjacent text. If the estimated degree of user effectiveness is above a given threshold $\Delta$, the system may trigger the content insertion process. The threshold $\Delta$ may be configurable.

In some embodiments, the system may customize and/or refine the content to be inserted based on a user or reader's characteristic or characteristics, for example, adjusting the length of text, size and/or dimension of an image, and/or other features presented or displayed on the user's device. Based on an analysis of an unused part of the user device or graphical user interface (GUI), and for example, to reduce distraction level, the system may determine at runtime the characteristic and location of the content to be inserted.

In some embodiments, the system may continuously learn the user effectiveness with respect to the inserted content, for example, displayed or presented to the user. The system, for example, may use gaze patterns analysis and identify one or more areas or locations on the GUI or device, on which the user most frequently focus. The system may further caution against, de-prioritize and/or suggest removing inserted content or content to be inserted, which are associated with predicted ineffective outcome of the user to complete reading the story (user reading content).

FIG. 1 is a block diagram illustrating components of a computing system for inserting contextual textual information with textual content. Example of information inserted is an advertisement such as an advertisement for a product. The components shown include computer-implemented components, for instance, implemented and/or run on one or more hardware processors, or coupled with one or more hardware processors. One or more hardware processors, for example, may include components such as programmable logic devices, microcontrollers, memory devices, and/or other hardware components, which may be configured to perform respective tasks described in the present disclosure. Coupled memory devices may be configured to selectively store instructions executable by one or more hardware processors.

A content generator 102 generates contextual content, for example, contextual content for an advertisement to be inserted. One or more existing techniques such as an artificial intelligence technique can be used to generate such textual content. The context generator 102 may receive or obtain input processed by a contextual analysis module 108, and also input from an information database 104. Input to the content generator 102 may also include user-related information 106.

A database 104 can store or contain information for insertion, which can be stored on at least one storage device. For example, the database 104 can be an advertisement database, which stores information associated with product specification, product name, usage of the product, pattern of using the product, and/or other information. The database 104 may also connect to, or can obtain, user information 106, for example, so that the content generator 102 can create a story or content (e.g., contextual advertisement) that can be personalized to the user.

A contextual analysis module 108 can analyze a story or content which is being read or selected for narrating. For example, the contextual analysis module 108 may receive or obtain the story or content a user is reading, and analyze the content. For example, the contextual analysis module 108 may be operably connected or coupled to a user interface or an app running on a user device, which can detect a user selecting to read, or reading a story (or content). The contextual analysis module 108, for example, can communicate with such a user interface or an app detecting the user selecting to read or reading a story, receive the story and analyze the story. For instance, the contextual analysis module 108 can analyze the content of the story, and identify specific keywords, different parts of speech, and contextual sense of the content, and/or other contextual information about the story (or content). The textual content generator 102 received the information analyzed or identified by the contextual analysis module 108 as input.

The content generator 102 receives contextual information of the story 110 (referred to as "original story"), receives information (e.g., advertisement information) from the database 104, and user-related information 106 of a reader of the story 110. Examples of the user-related information 106 may include, but are not limited to, a product need, a choice of product, and/or others. The content 102 generator may generate content (e.g., of a text, audio or other type) considering one or more product and/or service name from the database, which stores product and/or service information. The content generator 102, for example, identifies keywords (e.g., chocolate) from the original content and may use a natural language processing algorithm, attention mechanism, e.g., based on deep learning or recurrent neural networks, to generate content (e.g., an advertisement) to be inserted.

The content generator 102 can communicate with the contextual analysis module 108 of the story and identify a location (i.e., <position, coordinate> pair) where the generated content (e.g., advertisement) can be inserted. Based on the identified location of where to insert the generated content, a space within the original story content 110 is created (e.g., by pushing a piece of content such as a word or a phrase to the left, right, up, and/or down) according to the identified location (e.g., <position, coordinate> pair), into which the generated contextual content can be inserted.

The contextual analysis module 108 may perform a validation to check whether the insertion of the additional content with the story is changing the contextual meaning of the story. In some embodiments, the contextual analysis module computes deviation or similarity of continuity or semantics of the original content from the original content with inserted content. In one example implementation, the method of computing the semantics deviation or similarity may use a Jaccard similarity algorithm or weighting TF (term frequency) or TF-IDF (term frequency-inverse document frequency) technique followed by using cosine similarity algorithm. Based on the contextual analysis module 108 validating the added content, the content generator 102 may regenerate content so that contextual sense of the story remains the same (or with an acceptable deviation threshold Δ) and continuity or semantics of the story is maintained. Regenerating content to be inserted may include generating a new content (to be inserted), adjusting or modifying the previously generated content to maintain the original content or story continuity and/or similarly before and after content insertion.

The generated content and the location (e.g., <position, coordinate> pair) of the story into which the generated content is to be inserted, can be communicated to a user interface or app that is presenting the story to the user, for example, on a user device. The content generator 102, for example, may communicate the generated content and the identified position, and may also cause the user interface or the like to insert and highlight the added content (e.g., the product or service which is added with the story content) so that the user can visually recognize the added information (e.g., an advertisement). Highlighting can take a form of a flag, different font, a change of the resolution of inserted text, different pixel intensity, or any other differentiating format. In another aspect, if the content is being presented to the user as an audio (e.g., the user is listening to the story), then the added content can be spoken or audibly conveyed to the user in different tone, cadence, or in another differentiating manner, so that user can understand that the spoken content is an added information, for example, an advertisement. An example of the story with added content is shown at 112.

User's feedback (e.g., likes, dislikes), the user's focus and attention toward the inserted content, skipping of the inserted content) may be received, for example, via a user interface or the like. For example, the contextual analysis module 108 may receive user feedback, and determine whether continuity and/or semantics of the content is maintained.

Figure 2:
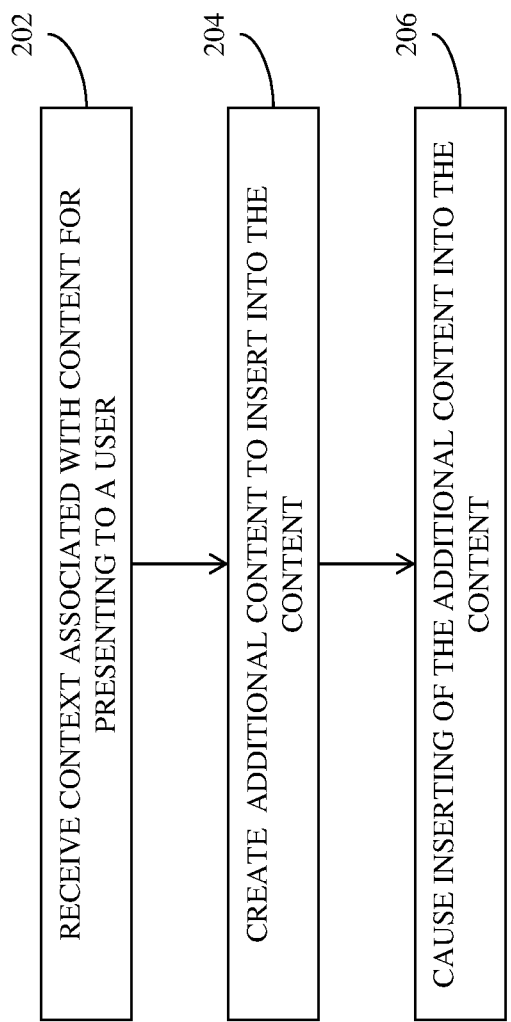
FIG. 2 is a diagram illustrating a method in one embodiment.

FIG. 2 is a diagram illustrating a method in one embodiment. The method may be executed or performed by one or more hardware processors. The method, for example, can generate content, which is in context with a current story or content being read or to be read, for example, while preserving a user focus of attention on the story. At 202, the method may include receiving context associated with content for presenting to a user. The context, for example, can be identified by analyzing the content (e.g., a story). For instance, the method may also include analyzing the content to identify the context, the analyzing including at least extracting a plurality of keywords and parts of speech in the content.

At 204, the method may include creating additional content to insert into the content (e.g., story). The additional content is created within the context associated with the content, for example, the additional content is in context with the content. The additional content is created also based on a likely responsiveness of the user to the additional content. The additional content can be created based at least on the context associated with the content and a characteristic associated with the user, for example, a user preference, liking, and/or another characteristic. The method may also include identifying a location (e.g., <position, coordinate> pair) in the content to insert the additional content, the location identified based at least on the likely responsiveness of the user to the item being inserted in the location.

The additional content refers to, or is about, an item. An example of the item can be a product. Another example can be a service. The additional content preserves continuity and/or semantics of the content, for example, flows with the content (e.g., story). At 206, the additional content can be inserted into the content (e.g., story).

As an example, the content may include at least audio content, and the method may further include causing a change in cadence (or another feature) of reading the audio content during a period of time the additional content is read.

The method may also include estimating a current reading progression rate of the user, the estimated current reading progression is used to determine whether to insert the additional content to the content, for example, whether to promote or demote the inserting of the additional content. The method may also include determining a frequency of the additional content to be inserted into the content at least based on the estimated current reading progression rate of the user. The method may also include predicting the user's ability (i.e., the degree of user effectiveness) to complete a specified section of the content in a predefined time at least based on the estimated current reading progression rate of the user. The estimated degree of user effectiveness can be used to determine whether to insert the additional content to the content (e.g., story).

Figure 3:
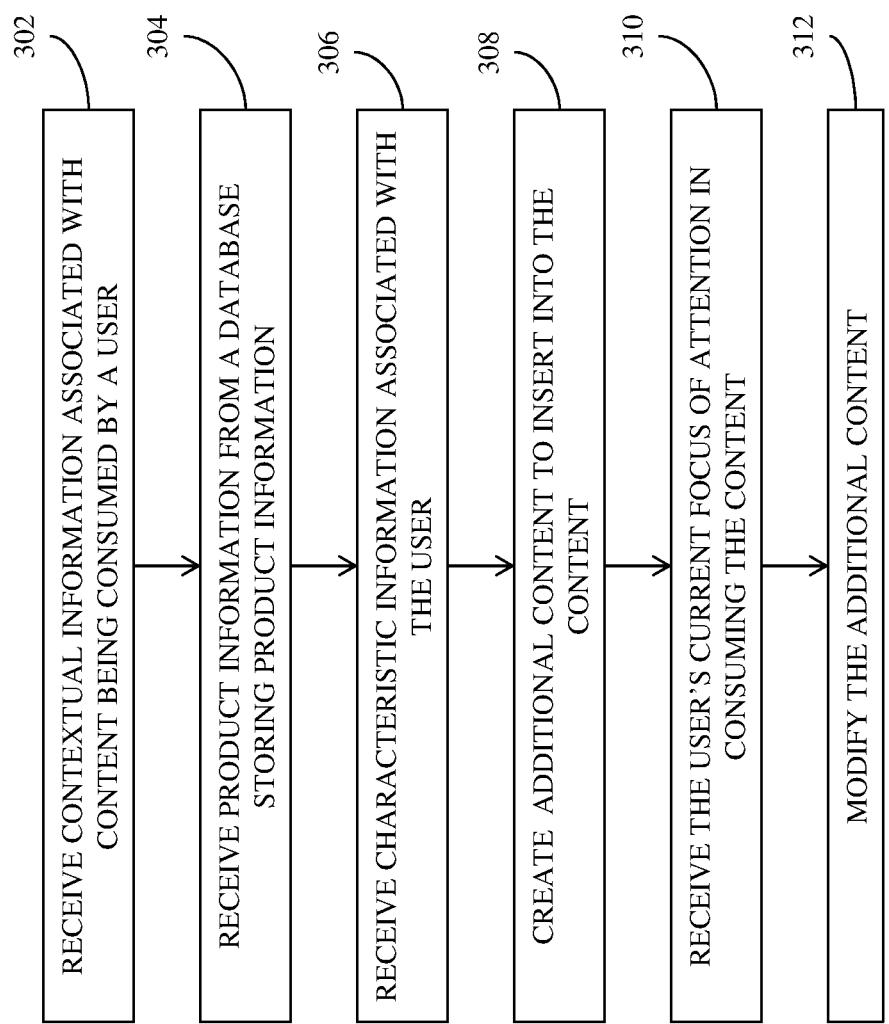
FIG. 3 is a diagram illustrating a method in another embodiment.

FIG. 3 is a method in another embodiment. The method may be performed or executed by one or more hardware processor. At 302, the method may include receiving contextual information associated with content being consumed by a user. For example, the content can be analyzed to determine its context, for example, based on one or more words or keywords, sentence structure such as parts of speech, and/or other information associated with the content.

At 304, the method may include receiving product information from a database storing product information. For instance, a storage device may store a database including data about a plurality of products and/or services. At 306, the method may include receiving characteristic information associated with the user. For example, user profile information such as a user's preference, liking, reading proficiency, and/or others, may be received.

At 308, the method may include, based at least on the contextual information, the product information and the characteristic information, creating an additional content to insert into the content (e.g., story). The additional content describes or refers to a product (and/or service) associated with the product information, and still preserves continuity and/or semantic in the context of the content.

At 310, the method may include receiving the user's current focus of attention in consuming the content. For example, user's current reading or consumption progress can be monitored as the user reads or consumes the content, for example, progress from word to word in the content (e.g., story).

At 312, the method may include, at least based on the user's current focus of attention and the characteristic information, modifying the additional content. For example, based on the topic of the user's current focus of attention, the additional content can be modified to refer to an item (e.g., product and/or service) related to the topic. The additional content can also be modified based on determining the user's responsiveness level to the modified additional content (e.g., if so modified) while consuming the content at the user's current focus of attention and by preserving the continuity and/or semantic of the content (e.g., story).

Embodiments and/or components of embodiments described herein can be combined with each other, for example, in a suitable manner, if they are not mutually exclusive.

Figure 4:
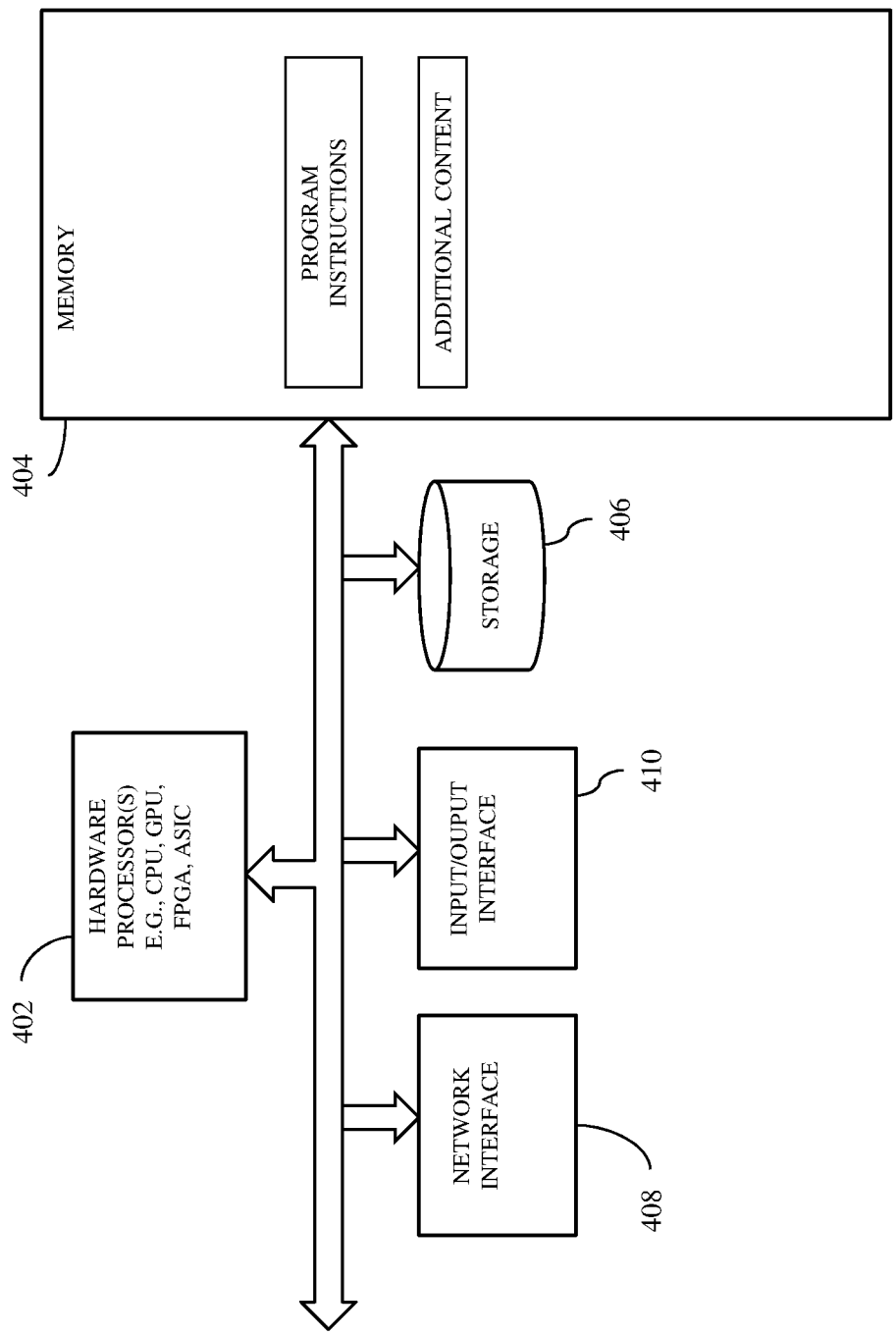
FIG. 4 is a diagram showing components of a system in one embodiment, which may create additional content for insertion into content, for example, which is in context with the content.

FIG. 4 is a diagram showing components of a system in one embodiment, which may create additional content for insertion in content, for example, which is in context with the content. One or more hardware processors 402 such as a central processing unit (CPU), a graphic process unit (GPU), and/or a Field Programmable Gate Array (FPGA), an application specific integrated circuit (ASIC), and/or another processor, may be coupled with a memory device 404, and generate additional content to insert into content, for example, which is being consumed by a user. A memory device 404 may include random access memory (RAM), read-only memory (ROM) or another memory device, and may store data and/or processor instructions for implementing various functionalities associated with the methods and/or systems described herein. One or more processors 402 may execute computer instructions stored in memory 404 or received from another computer device or medium. A memory device 404 may, for example, store instructions and/or data for functioning of one or more hardware processors 402, and may include an operating system and other program of instructions and/or data. One or more hardware processors 402 may receive input, which may include context associated with the content, information associated with an item (e.g., a product and/or service), and user characteristic such as a user's liking or preference. In one embodiment, one or more hardware processors 402 may also analyze the content to determine its context. In one embodiment, input such as the information associated with an item and/or user characteristic information may be stored in a storage device 406 or received via a network interface 408 from a remote device, and may be temporarily loaded into a memory device 404 for building or generating the additional content. One or more hardware processors 402 may also cause the generated additional content to be inserted into the content, for instance, while the user is consuming the content. The additional content generated may be stored on a memory device 404. One or more hardware processors 402 may be coupled with interface devices such as a network interface 408 for communicating with remote systems, for example, via a network, and an input/output interface 410 for communicating with input and/or output devices such as a keyboard, mouse, display, and/or others.

A system, for example, can be an artificial intelligence-based system, which can analyze the content (e.g., a story) and can dynamically insert, or caused to insert, textual advertisement (or audio advertisement) with the story in such way that the user consuming the story can consume the textual (or audio) advertisement content along with the story's content, without an interrupt to the context of the story. For instance, the user may feel that the added content is part of the story, and the continuity and/or semantics of the story is maintained.

Figure 5:
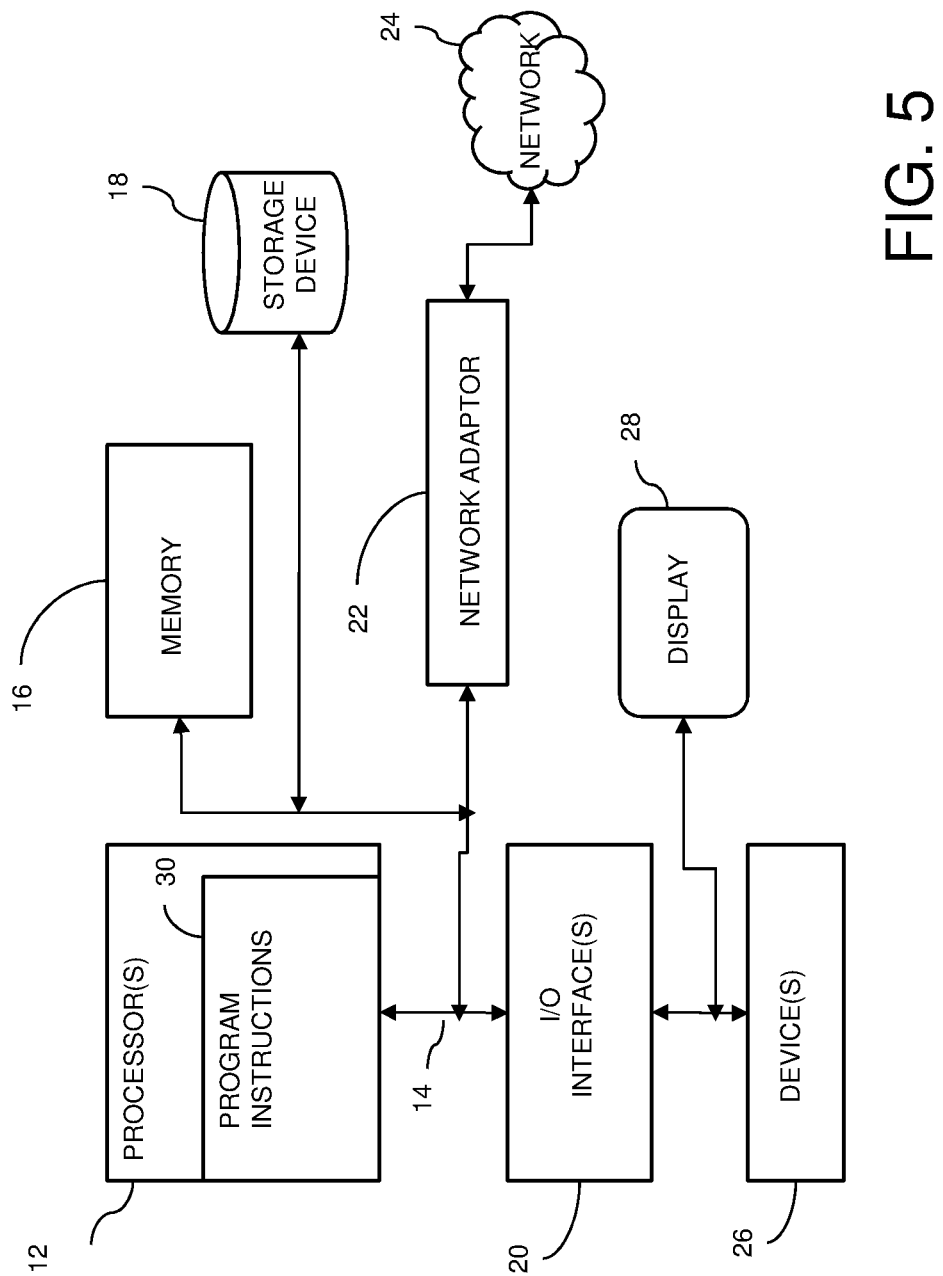
FIG. 5 illustrates a schematic of an example computer or processing system that may implement a system according to one embodiment.

FIG. 5 illustrates a schematic of an example computer or processing system that may implement a system according to an embodiment. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
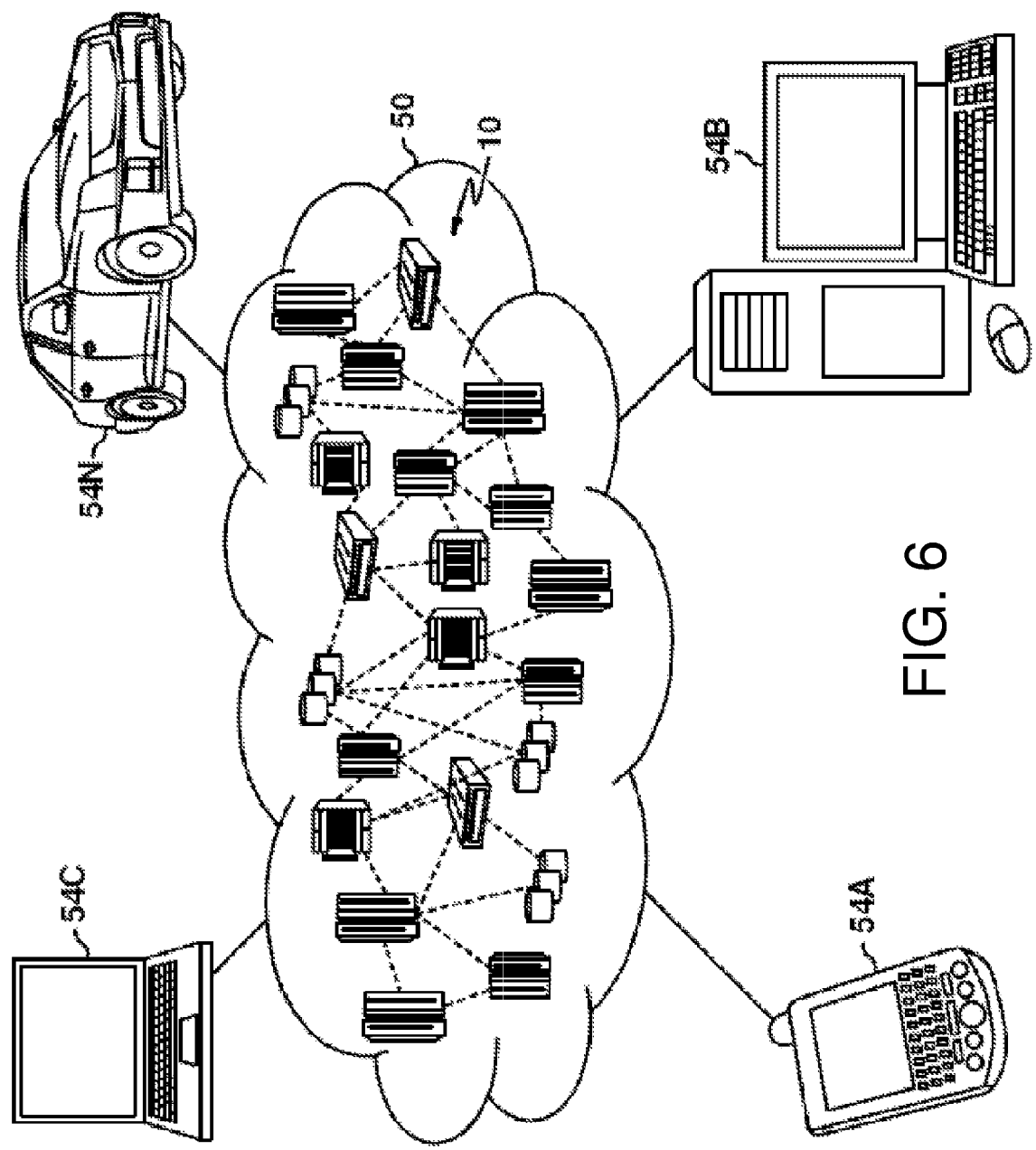
FIG. 6 illustrates a cloud computing environment in one embodiment.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
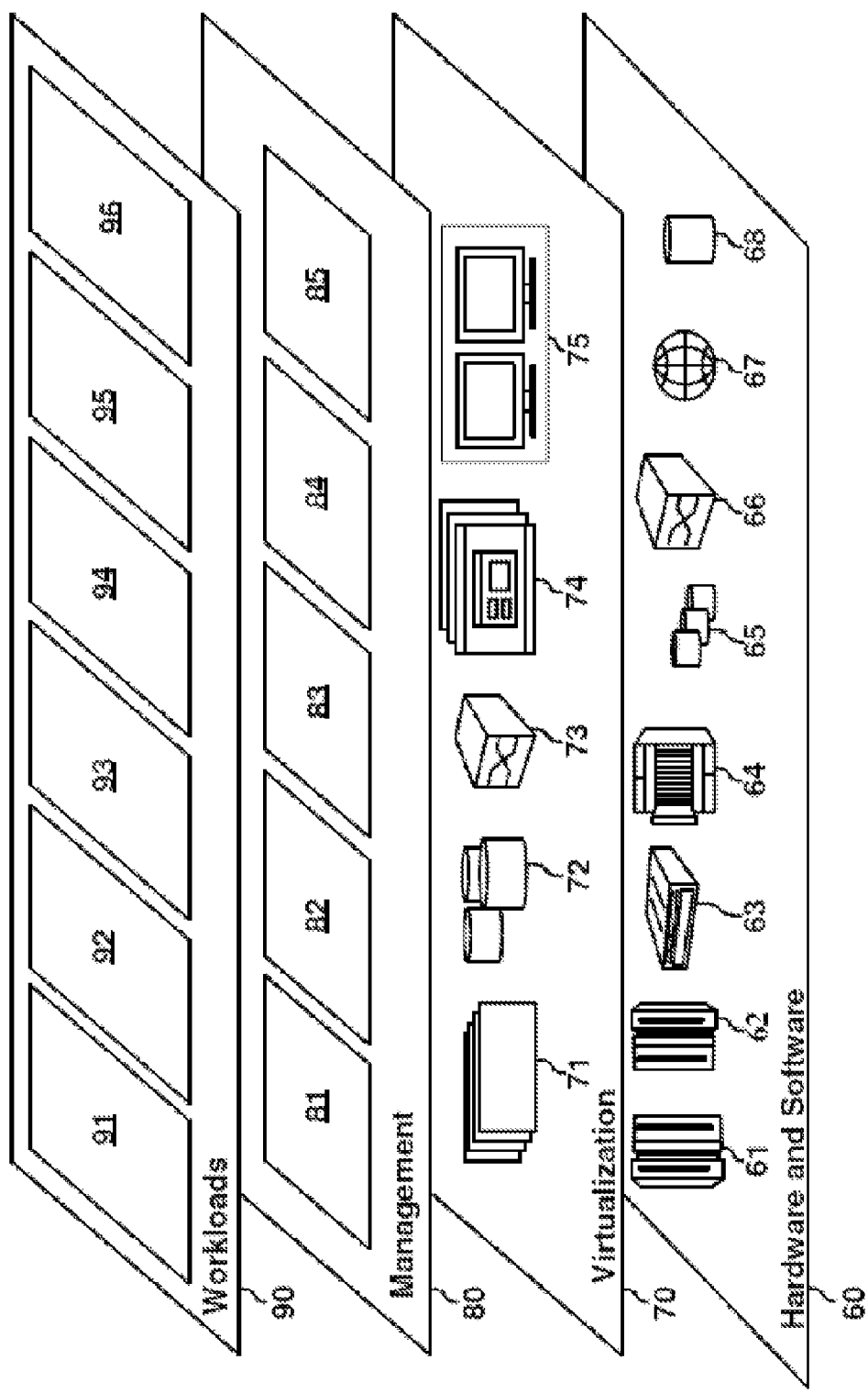
FIG. 7 illustrates a set of functional abstraction layers provided by cloud computing environment in one embodiment of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and content insertion processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system comprising:
   a hardware processor;
   a storage device operably coupled to the hardware processor, the storage device storing information related to a plurality of items;
   the hardware processor operable to at least:
   analyze content being consumed on a user device to determine context of the content;
   receive from the storage device information associated with an item, the item related to the context of the content;
   receive a characteristic of a user consuming the content;
   based on the context and the characteristic of the user, create an additional content including at least a reference to the item, for inserting into the content, the additional content also referencing at least one content word in a sentence of the content;
   validate whether the created additional content changes contextual meaning of the content by computing deviation of semantics between the content and the additional content;
   wherein the additional content preserves continuity in the context of the content,
   wherein a position of inserted content on the user device changes for different users consuming the content and the additional content changes based on the position,
   wherein the additional content replaces parts of the content that has been consumed.

2. The system of claim 1, wherein the item includes at least a product.

3. The system of claim 1, wherein the item includes at least a service.

4. The system of claim 1, wherein the content includes at least an audio content, and the hardware processor is further operable to cause a change in cadence of reading the audio content during a period of time the additional content is read.

5. The system of claim 1, wherein the hardware processor is further operable to identify a location in the content to insert the additional content, the location identified based at least on a likely responsiveness of the user to the item being inserted in the location.

6. The system of claim 1, wherein the hardware processor is further operable to estimate a current reading progression rate of the user, the estimated current reading progression used to determine whether to insert the additional content to the content.

7. The system of claim 6, wherein the hardware processor is further operable to determine a frequency of the additional content to be inserted into the content at least based on the estimated current reading progression rate of the user.

8. The system of claim 6, wherein the hardware processor is further operable to predict the user's ability to complete a specified section of the content in a predefined time at least based on the estimated current reading progression rate of the user to determine whether to insert the additional content to the content.

9. The system of claim 1, wherein the hardware processor is further operable to analyze the content to identify the context by at least extracting a plurality of keywords and parts of speech in the content.

10. A computer program product comprising a non-transitory computer readable storage medium having program instructions embodied therewith, the program instructions executable by a processor to cause the processor to:
    analyze content including a story being consumed on a user device to determine context of the content;
    select an item from a database of items, the item related to the context of the content;
    receive a characteristic of a user consuming the content;
    based on the context and the characteristic of the user, dynamically create an additional content including a storyline about the item, for inserting into the content, the storyline about the item continuing to tell the story in the context of the content,
    validate whether the storyline about the item changes contextual meaning of the story by computing deviation of semantics between the story and the storyline,
    wherein the additional content preserves continuity in the context of the content,
    wherein the processor further causes the user device to present the storyline about the item inbetween lines in the story.

11. The computer program product of claim 10, wherein the item is a product.

12. The computer program product of claim 10, wherein the item is a service.

* * * * *